US012761117B2

(12) United States Patent
Baldwin-Squibb et al.

(10) Patent No.: US 12,761,117 B2
(45) Date of Patent: Oct. 13, 2026

(54) SYSTEM AND METHOD FOR MISFIRE DETECTION FOR DUAL SPARK PLUG ENGINE

(71) Applicant: FCA US LLC, Auburn Hills, MI (US)

(72) Inventors: Cody Baldwin-Squibb, White Lake, MI (US); William P Attard, Brighton, MI (US); Matthew Delleree, Brighton, MI (US); Michael McMeekin, Auburn Hills, MI (US); Matthew Bresler, Clarkston, MI (US); Saleel Mahajan, Rochester Hills, MI (US); Jonathan Stoffer, Oakland Township, MI (US); Sahil Sandhu, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 231 days.

(21) Appl. No.: 18/424,939

(22) Filed: Jan. 29, 2024

(65) Prior Publication Data

US 2025/0244207 A1 Jul. 31, 2025

(51) Int. Cl.

| | |
|---|---|
| ***G01M 15/11*** | (2006.01) |
| ***F02P 5/04*** | (2006.01) |
| *F02P 17/12* | (2006.01) |

(52) U.S. Cl.

CPC ............. *G01M 15/11* (2013.01); *F02P 5/045* (2013.01); *F02P 2017/123* (2013.01)

(58) Field of Classification Search

CPC . F02D 2200/1015; G01M 15/11; F02P 5/045; F02P 15/08; F02P 2017/123

See application file for complete search history.

(56) References Cited

U.S. PATENT DOCUMENTS

| | | | | |
|---|---|---|---|---|
| 5,241,937 A * | 9/1993 | Kanehiro | ................ | F02P 17/12 123/406.27 |
| 6,848,421 B1 * | 2/2005 | Karau | ................... | F02D 35/021 123/406.28 |

(Continued)

FOREIGN PATENT DOCUMENTS

| | | | |
|---|---|---|---|
| DE | 102016210264 A1 * | 1/2017 | ............. F02P 5/152 |

OTHER PUBLICATIONS

Zhu et al. "Closed-Loop Ignition Timing Control for SI Engines Using Ionization Current Feedback" IEEE Transactions on Control Systems Technology, vol. 15, No. 3, May 2007 (Year: 2007).*

*Primary Examiner* — John Fitzgerald
(74) *Attorney, Agent, or Firm* — Jeremy J. Klobucar

(57) ABSTRACT

A system for detecting a source of a misfire for a turbulent jet ignition (TJI) engine having a first ignition device disposed in a pre-chamber of a cylinder head and a second ignition device disposed for communication with a main combustion chamber is presented. The system includes a controller that determines engine operating conditions; generates a first spark from the first ignition device at a first time; generates a second spark from the second ignition device at a second time; activates a skipfire mode based on a determination that the engine operating conditions are satisfactory, wherein in the skipfire mode, the controller generates a modified second spark at a modified second time, the modified second time being later than the second time; and determines a misfire event based on sensing ionization of gasses at the main combustion chamber subsequent to firing the first and second ignition devices.

20 Claims, 3 Drawing Sheets

(56) References Cited

U.S. PATENT DOCUMENTS

| | | | | |
|---|---|---|---|---|
| 7,624,717 | B2 * | 12/2009 | Inada | F02P 5/1502 123/406.12 |
| 8,096,282 | B2 * | 1/2012 | Franks | F02D 41/1498 123/406.27 |
| 9,353,674 | B2 * | 5/2016 | Bunce | F02B 19/1057 |
| 9,835,066 | B2 * | 12/2017 | Cook | F01N 3/2066 |
| 10,458,311 | B2 * | 10/2019 | Blaxill | F02B 19/1028 |
| 11,680,512 | B2 * | 6/2023 | Bertsch | F02B 19/12 123/260 |
| 11,686,251 | B1 * | 6/2023 | Attard | F02P 15/02 60/776 |
| 11,959,435 | B1 * | 4/2024 | Yu | F02P 5/045 |
| 12,378,937 | B1 * | 8/2025 | McMeekin | F02P 9/002 |
| 2025/0109729 | A1 * | 4/2025 | Delleree | F02P 9/00 |

* cited by examiner

SYSTEM AND METHOD FOR MISFIRE DETECTION FOR DUAL SPARK PLUG ENGINE

FIELD

The present application generally relates to spark ignition (SI) engines and, more particularly, to techniques for detecting a misfire for an engine having dual spark plugs.

BACKGROUND

In today's internal combustion engines, the spark timing with respect to the respective piston strokes affects the quality of combustion. It is therefore desirable to accurately determine and control the spark timing because poor combustion quality due to inaccurate spark timing could result in decreased fuel economy and/or engine knock. An internal combustion engine that incorporates turbulent jet ignition (TJI) includes a pre-chamber with a first spark plug inside and installed generally in the center of the cylinder head. A second spark plug is mounted in an offset position in the main combustion chamber. The pre-chamber typically connects to the main combustion chamber with multiple passages. Flame is initiated inside the pre-chamber and jets into the main combustion chamber to ignite the bulk fuel air mixture.

With a turbulent jet ignition (TJI) engine, there exists both a pre-chamber (PC) ignition from the first spark plug and a secondary ignition in a main combustion chamber (MC) from the second spark plug. In this regard, both the pre-chamber and the secondary ignition timings have an influence on torque efficiency. When a TJI engine experiences a misfire, it is important to properly identify the misfire and ensure safe engine operation. Prior art methods for detecting misfire can be complicated and can result in spark plug damage. Accordingly, there remains a need for improvement in the relevant art to identify, and react to a misfire in a TJI engine.

SUMMARY

According to one example aspect of the invention, a system for detecting a source of a misfire for a turbulent jet ignition (TJI) engine having a first ignition device disposed in a pre-chamber of a cylinder head and a second ignition device disposed for communication with a main combustion chamber is presented. The system includes a controller that determines engine operating conditions; generates a first spark from the first ignition device at a first time; generates a second spark from the second ignition device at a second time; activates a skipfire mode based on a determination that the engine operating conditions are satisfactory, wherein in the skipfire mode, the controller generates the first spark from the first ignition device at the first time and generates a modified second spark at a modified second time, the modified second time being later than the second time; and determine a misfire event within an Ion sense window based on sensing ionization of gasses at the main combustion chamber subsequent to firing the first and second ignition devices at the respective first and modified second times.

According to some implementations, the controller is further configured to generate the modified second spark at the modified second time at less than every engine cycle.

According to some implementations, the controller is further configured to generate the modified second spark at the modified second time at only once every seven to thirteen engine cycles.

According to some implementations, the controller is further configured to generate the modified second spark at the modified second time at only once every ten engine cycles.

In other features, the second time is between 100 and 200 crank degrees.

In other features, the second modified time is between 200 and 400 crank degrees.

In other features, the second modified time is about 360 crank degrees.

According to another example aspect of the invention, a method for detecting a source of a misfire for a turbulent jet ignition (TJI) engine having a first ignition device disposed in a pre-chamber of a cylinder head and a second ignition device disposed for communication with a main combustion chamber is presented. The method includes determining engine operating conditions; generating a first spark from the first ignition device at a first time; generating a second spark from the second ignition device at a second time; activating a skipfire mode based on a determination that the engine operating conditions are satisfactory, wherein in the skipfire mode, the controller generates the first spark from the first ignition device at the first time and generates a modified second spark at a modified second time, the modified second time being later than the second time; and determining a misfire event within an Ion sense window based on sensing ionization of gasses at the main combustion chamber subsequent to firing the first and second ignition devices at the respective first and modified second times.

According to some implementations, the method further includes generating the modified second spark at the modified second time at less than every engine cycle.

According to some implementations, the method further includes generating the modified second spark at the modified second time at only once every seven to thirteen engine cycles.

According to some implementations, the method further includes generating the modified second spark at the modified second time at only once every ten engine cycles.

In other features, the second time is between 100 and 200 crank degrees.

In other features, the second modified time is between 200 and 400 crank degrees.

In other features, the second modified time is about 360 crank degrees.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, prior art methods for detecting misfire on TJI engines having dual spark plugs (pre-chamber and main chamber) associated with each cylinder can be complicated and can result in spark plug damage. For example, some prior art methods turn off the main chamber coils and implement a modified misfire detection strategy from an Ion sense strategy to a crankshaft-based strategy at high loads. An Ion sense strategy is a type of misfire detection technology that uses the main spark plug as a sensor. The present disclosure provides a full range Ion sense based misfire detection strategy that requires some frequency of continued main chamber coil operation to maintain sufficient power to the Ion sense circuit.

In some implementations the risk of premature spark plug wear can be elevated as the coils are currently operated every firing cycle into high pressures during the combustion phase. The instant method disclosed herein implements a calibratable method, referred to herein as “skipfire”, that reduces the frequency and phasing of the main chamber spark events needed to reduce the risk of premature spark plug wear. The Ion sense circuit disclosed herein retains sufficient charge without having to fire every cycle while still adequately detecting combustion and misfire. In this regard, a full range misfire detection for all engine speeds, loads, temperatures and other parameters is provided. Further, and as described herein, the Ion sense coils will continue to be powered and wear to the spark plugs will be minimized.

Figure 1:
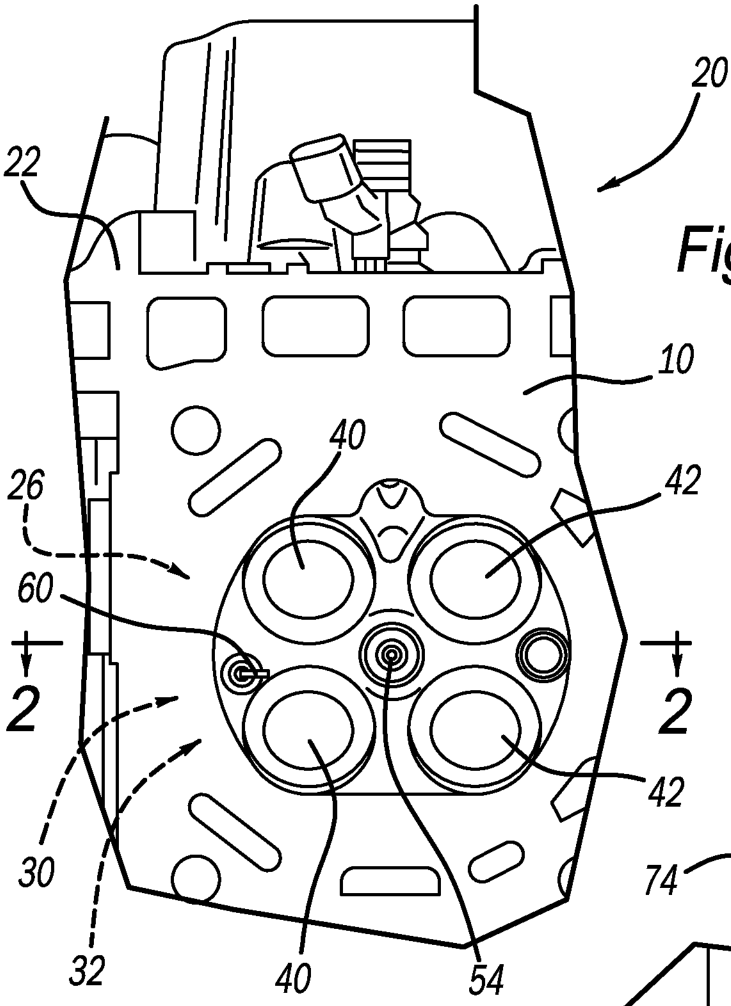
FIG. 1 is an elevational view of a cylinder head of an exemplary TJI engine according to the principles of the present disclosure.
Figure 2:
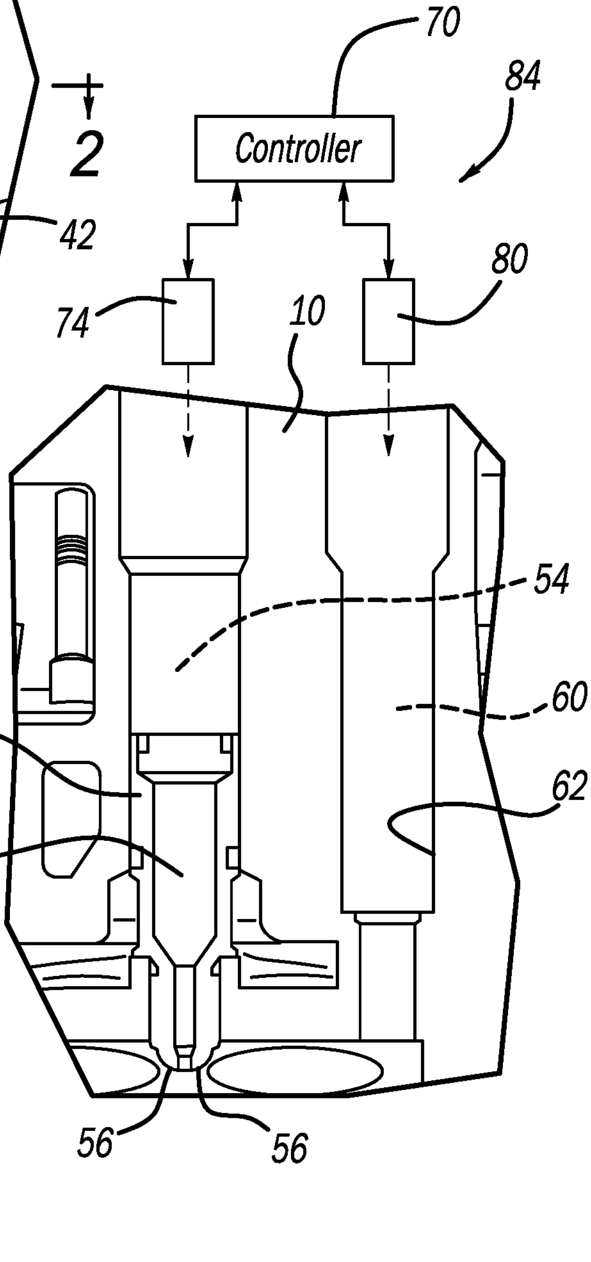
FIG. 2 is a cross-sectional view taken along lines 2-2 of FIG. 1 according to the principles of the present disclosure.

With initial reference to FIGS. 1 and 2, an exemplary cylinder head is shown and generally identified at reference numeral 10. The cylinder head 10 is incorporated into an internal combustion engine 20 having an engine block 22 incorporating one or more cylinders 26. A piston 30 is supported for reciprocal movement within a cylinder 26 defined in the engine block 22. The cylinder head 10, cylinder 26 and piston 30 cooperate to define a combustion chamber 32. The exemplary internal combustion engine 20 includes two intake ports 40 and two exhaust ports 42.

As is known, the intake and exhaust ports 40 and 42 open and close via valves to provide fluid communication between the cylinder and the intake manifold and the exhaust manifold (not specifically shown). It will be appreciated that while two intake ports 40 and two exhaust ports 42 are shown, the internal combustion engine 20 may incorporate any number of intake and/or exhaust valves. By way of example only the engine block 22 can be configured to have four cylinders. It will be appreciated that the methods and control strategies discussed herein can be applicable to TJI engines having different amounts of cylinders.

The cylinder head 10 includes a pre-chamber 50 having a pre-chamber insert 52 disposed therein. A first ignition device or pre-chamber spark plug 54 is disposed in the pre-chamber 50. The pre-chamber insert 52 defines a plurality of small orifices 56 defined therein. The orifices 56 provide communication between the pre-chamber 50 and the combustion chamber 32. An injector, not specifically shown, can deliver fuel into the pre-chamber 50. The first spark plug 54 can ignite the fuel in the pre-chamber 50. The pre-chamber 50 is a small volume outside of a typical combustion chamber where combustion can be initiated with a dedicated spark plug. Hot gasses expel from the pre-chamber 50 and propagate through the main combustion chamber, driving combustion in the cylinder 26.

A second ignition device or second spark plug 60 is disposed in an adjacent cavity, or main chamber 62 provided on the cylinder head 10. In some implementations the second spark plug 60 can be referred to as a side spark plug. Once ignited, the fuel is forced through the orifices 56 of the pre-chamber insert 52. Flame is initiated inside the pre-chamber 50 and jets into the main combustion chamber 32 to ignite the bulk fuel air mixture. A controller 70 is configured to command firing timing signals to the first and second spark plugs 54 and 60 through respective ignition coils 74 and 80 based on sensed operating conditions and implemented firing strategies such as those described herein. The controller 70 includes an Ion sense circuit or system 84 that implements a skipfire mode for detecting misfire of the engine 20. While a single controller 70 is illustrated in FIG. 1 it will be appreciated that more controller and/or modules, such as a supervisory vehicle control module, powertrain control module, and engine control module can be used individually or in concert to control operation of the engine 20 based on various operating conditions.

Under normal operating conditions of the TJI engine 20, outside of wide open throttle, both of the first and second spark plugs 54 and 60 are fired. When the first and second spark plugs 54 and 60 are being fired, they are fired at offset times (e.g., at different crank angles) or as used herein, “stagger”. The second spark plug 60 incorporates an Ion sense feature for misfire detection. As mentioned above, an Ion sense strategy is a type of misfire detection technology that uses the main spark plug 60 as a sensor. A voltage is biased across the gap in the spark plug 60 when the spark plug 60 is not sparking. The system is charged while sparking. The system is active after the spark is gone and combustion is occurring. The ionization of the gasses are sensed. In other words, the gases within the combustion chamber 62 are present in a plasma state which have charged particles (ions). The space between the electrodes is excited to be able to sense the ionization. Combustion has occurred if the ionization is sensed. If ionization is not sensed, then combustion has not happened.

As used herein a misfire is used to denote a condition where a pre-chamber 50 does not light the fuel air for a particular cycle causing a preignition on a subsequent cycle. Because the second spark plug 60 is fired late, and it initiates a flame late, high pressure and temperature can cause engine knock and/or pre-ignition. In some examples, it can be desirable to forgo firing of the second spark plug 60 at wide-open throttle as it may not be necessary to fire the second spark plug 60 at high loads for combustion requirements. However, to properly identify a misfire using the Ion sense feature, the second spark plug 60 needs to be fired.

In some prior art implementations, an Ion sense misfire detection strategy can be carried out on the first (pre-chamber) spark plug 54. Incorporating such Ion sense misfire detection can require additional complexity and cost. The instant disclosure provides a robust and low cost solution to misfire detection. The instant disclosure fires the main spark plug 60 in the exhaust stroke (or 360 degrees later) when the potential for a knock or pre-ignition event is reduced.

Figure 3:
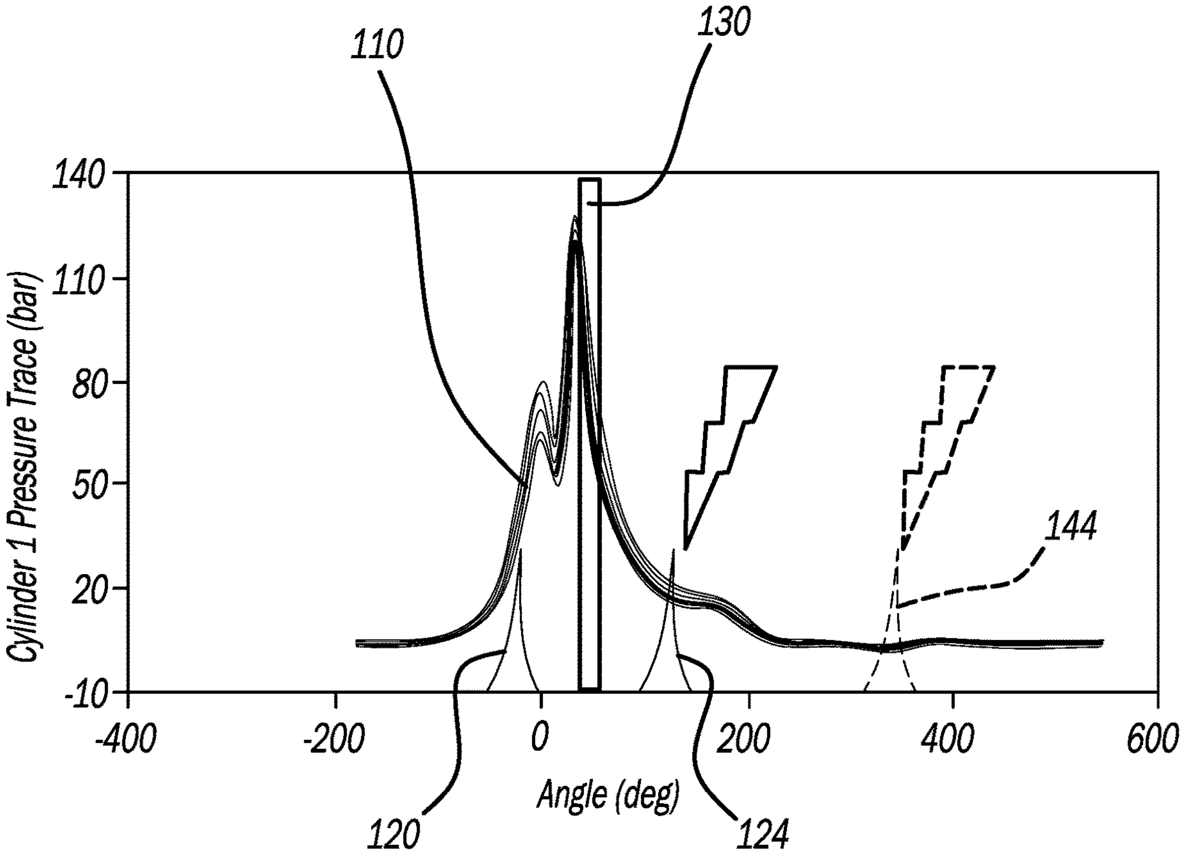
FIG. 3 is an exemplary crank shaft angle versus pressure trace for a cylinder of the TJI engine of FIG. 1 illustrating an Ion sense window and a main chamber spark used to charge Ion sense possible to skip fire according to the principles of the present disclosure.

Turning now to FIG. 3, an exemplary crank shaft angle versus pressure trace for a cylinder of the TJI engine 20 of FIG. 1 is shown and generally identified at reference numeral 100. A cylinder pressure trace 110 is shown resulting from a first firing 120 of the pre-chamber plug 54 and a second firing 124 of the main chamber plug 60. An Ion sense signal window 130 is shown generally coinciding with a combustion event. The Ion sense signal window 130 is generated from the firing 124 of the main chamber plug 124. The Ion sense signal window 130 is the signal the instant disclosure maintains but while also shifting the timing of the firing 124 of the main chamber plug 124 to a delayed time (crank angle) shown at firing 144.

By moving the firing 144 to later in the cycle, it is less likely to cause knock or pre-ignition while still charging the coil 80 to maintain the Ion sense signal window 130 for the main combustion. By way of example only, the delayed firing 144 of the main chamber plug 124 can be initiated between 200 and 400 crank degrees. More specifically, the delayed firing 144 can be between 300 and 400 crank degrees. In the example shown in FIG. 3, the firing 144 can be around 360 degrees. In additional implementations, the firing 144 is commanded only at reduced amounts of engine cycles. For example, the firing 144 can be commanded only once per ten engine cycles. It is appreciated that the firing 144 can be commanded at other iterations that are less than or more than one per ten engine cycles, such as seven, eight, nine, eleven, twelve, thirteen or other amounts sufficient to charge the coil 80 to maintain the Ion sense signal window 130 for main combustion within the scope of the present disclosure.

Figure 4:
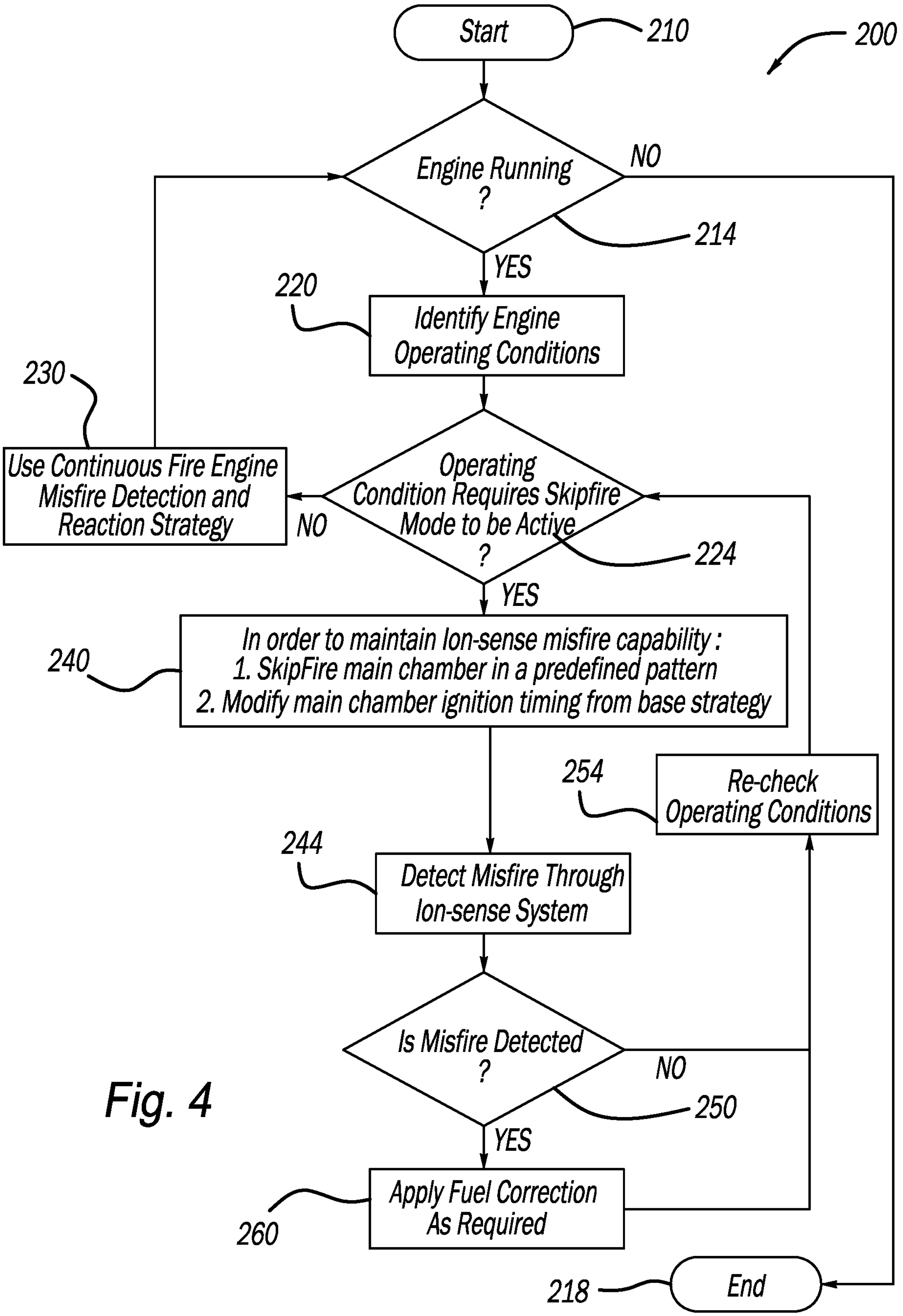
FIG. 4 is a flow diagram of an example method of performing a skip fire detection strategy on the TJI engine of FIG. 1 according to the present disclosure.

With additional reference now to FIG. 4 a method for detecting misfire in the dual spark plug engine 20 according to the present disclosure is shown and generally identified at reference 200. The method starts at 210. At 214 control determines whether the engine 20 is running. If the engine 20 is not running, control ends at 218. If the engine 20 is running, control identifies engine operating conditions at 220. Engine operating conditions can include various engine parameters such as, but not limited to, throttle position. At 224, control determines whether the operating conditions require a skipfire operating mode to be active. If control determines that the operating conditions do not satisfy operation in the skipfire operating mode, control uses a traditional continuous fire engine misfire detection and reaction strategy at 230.

If control determines that operating conditions require skipfire mode to be active at 224, control initiates the skipfire mode at 240. Again, and as described herein, the skipfire mode according the present disclosure maintains ion-sense misfire capability. At 240 the main chamber 62 is fired in a predefined skipfire pattern. The ignition timing of the main chamber 62 is modified from the conventional base strategy (from firing event 124 to firing event 144). At 244, control detects misfire through the ion-sense system 84. At 250 control determines whether a misfire is detected. If a misfire is not detected at 250, control re-checks operating conditions of the engine 20 at 254 and loops to 224. If misfire is detected at 250 the ion-sense system 84 control applies a fuel correction as required at 260 and control loops to 224.

It will be appreciated that the term "controller" as used herein refers to any suitable control device(s) that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A system for detecting a source of a misfire for a turbulent jet ignition (TJI) engine having a first ignition device disposed in a pre-chamber of a cylinder head and a second ignition device disposed for communication with a main combustion chamber, the system comprising:
- a controller configured to:
  - determine engine operating conditions;
  - generate a first spark from the first ignition device at a first time;
  - generate a second spark from the second ignition device at a second time;
  - activate a skipfire mode based on a determination that the engine operating conditions are satisfactory for maintaining Ion sense misfire detection while reducing main chamber spark plug wear, wherein the satisfactory engine operating conditions include a throttle position outside of wide open throttle, wherein in the skipfire mode, the controller is configured to generate the first spark from the first ignition device at the first time and generate a modified second spark at a modified second time, the modified second time being later than the second time; and
  - determine a misfire event within an Ion sense window based on sensing ionization of gasses at the main combustion chamber subsequent to firing the first and second ignition devices at the respective first and modified second times.

2. The system of claim 1, wherein the second time is between 100 and 200 crank degrees.

3. The system of claim 1, wherein the determining the misfire event comprises:
- biasing a voltage across a gap in the second ignition device when the second ignition device is not sparking;
- sensing ionization of gases in the main combustion chamber through the second ignition device; and
- determining that combustion has occurred if ionization is sensed, and determining that combustion has not occurred if ionization is not sensed.

4. The system of claim 1, wherein the Ion sense window occurs during a combustion phase subsequent to firing of the first ignition device at the first time.

5. The system of claim 1, wherein the controller is configured to:
- command firing timing signals to the first and second ignition devices through respective first and second ignition coils; and
- wherein generating the modified second spark at the modified second time charges the second ignition coil to maintain the Ion sense window for detecting misfire in the main combustion chamber.

6. The system of claim 1, wherein the controller includes an Ion sense circuit configured to implement the skipfire mode.

7. The system of claim 1, wherein activating the skipfire mode reduces a risk of premature wear of the second ignition device compared to firing the second ignition device at every engine cycle.

8. The system of claim 1, wherein the modified second time is selected to reduce a likelihood of engine knock or pre-ignition compared to the second time.

9. The system of claim 1, wherein the second modified time is between 200 and 400 crank degrees.

10. The system of claim 9, wherein the second modified time is about 360 degrees.

11. The system of claim 1, wherein the controller is further configured to:

generate the modified second spark at the modified second time at less than every engine cycle.

12. The system of claim 11, wherein the controller is further configured to:

generate the modified second spark at the modified second time at only once every seven to thirteen engine cycles.

13. The system of claim 11, wherein the controller is further configured to generate the modified second spark at the modified second time at only once every ten engine cycles.

14. A method for detecting a source of a misfire for a turbulent jet ignition (TJI) engine having a first ignition device disposed in a pre-chamber of a cylinder head and a second ignition device disposed for communication with a main combustion chamber, the method comprising:

determining engine operating conditions;

generating a first spark from the first ignition device at a first time;

generating a second spark from the second ignition device at a second time;

activating a skipfire mode based on a determination that the engine operating conditions are satisfactory for maintaining Ion sense misfire detection while reducing main chamber spark plug wear, wherein the satisfactory engine operating conditions include a throttle position outside of wide open throttle, wherein in the skipfire mode, the controller is configured to generate the first spark from the first ignition device at the first time and generate a modified second spark at a modified second time, the modified second time being later than the second time; and determining a misfire event within an Ion sense window based on sensing ionization of gasses at the main combustion chamber subsequent to firing the first and second ignition devices at the respective first and modified second times.

15. The method of claim 14, wherein the second time is between 100 and 200 crank degrees.

16. The method of claim 14, wherein the second modified time is between 200 and 400 crank degrees.

17. The method of claim 16, wherein the second modified time is about 360 degrees.

18. The method of claim 14, further comprising:

generating the modified second spark at the modified second time at less than every engine cycle.

19. The method of claim 18, further comprising:

generating the modified second spark at the modified second time at only once every seven to thirteen engine cycles.

20. The method of claim 18, wherein the controller is further configured to:

generate the modified second spark at the modified second time at only once every ten engine cycles.

* * * * *